H. N. KELLAR.
OIL BURNER.
APPLICATION FILED MAR. 12, 1910.
982,141.
Patented Jan. 17, 1911.
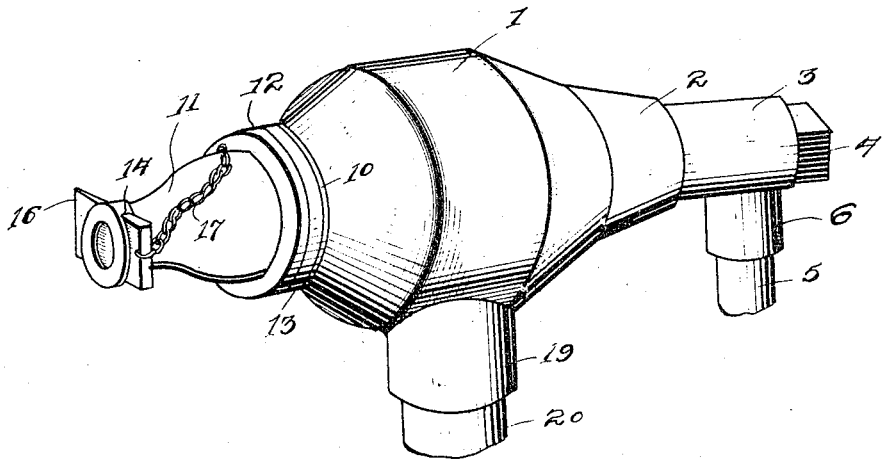
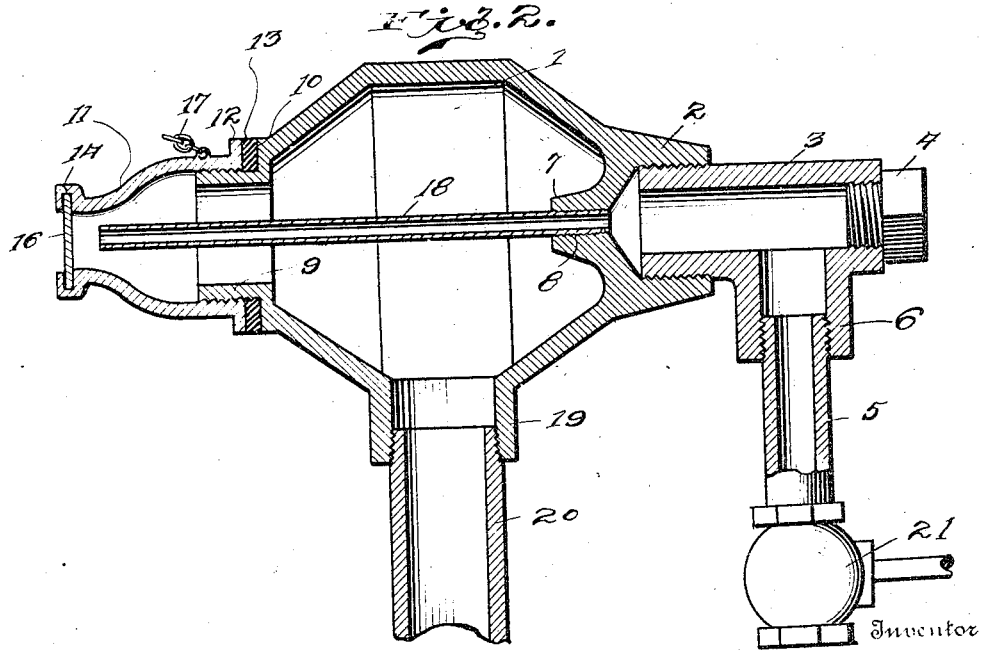

UNITED STATES PATENT OFFICE.

HENRY N. KELLAR, OF KIEFER, OKLAHOMA.

OIL-BURNER.

982,141.

Specification of Letters Patent. Patented Jan. 17, 1911.

Application filed March 12, 1910. Serial No. 548,687.

*To all whom it may concern:*

Be it known that I, HENRY N. KELLAR, a citizen of the United States of America, residing at Kiefer, in the county of Creek and State of Oklahoma, have invented certain new and useful Improvements in Oil-Burners, of which the following is a specification, reference being had therein to the accompanying drawing.

This invention relates to oil burners especially adapted for use in connection with crude oil, and the principal object of the same is to cause the fuel to be atomized and mixed with steam so that a thorough combustion of the fuel will be obtained.

Another object is to provide means whereby the fuel pipe may be thoroughly cleaned by the steam supply.

In carrying out the object of the invention generally stated above it will be understood, of course, that the essential features thereof, are necessarily susceptible of changes in details and structural arrangements, one preferred and practical embodiment of which is shown in the accompanying drawings, wherein:—

Figure 1 is a perspective view of the improved burner. Fig. 2 is a central vertical longitudinal sectional view thereof.

Referring to said drawings by numerals it will be seen that the improved burner comprises a body portion 1 that is hollow and preferably of a double-cone shape, one end thereof being provided with an internally threaded outwardly projecting recessed extension 2 in which one end of a three-way coupling 3 is detachably seated, said coupling having its outer end internally threaded for the reception of a plug 4. A fuel feeding pipe 5 has one end in threaded engagement with the angular portion 6 of said coupling. The inner end of the recessed extension 2 has a reduced portion 7 that projects into body 1 and has a threaded opening 8 formed through it. Body 1, at its end opposite extension 2 has an externally threaded tubular extension 9 and at the inner end of the threaded surface of said extension, body 1 is provided with a gasket seat 10. An outwardly tapering discharge nozzle 11 has an annular flange 12 at its inner end and is internally threaded so that it may be engaged over the tubular extension 9. A sealing gasket 13 is interposed between flange 12 and gasket seat 10, to make the joint tight. The discharge end of nozzle 11 has a transverse opening 14 formed through it which intersects the outlet of said discharge end, said opening being adapted to have a slide 16 that has a chain or other flexible connection 17 with body 1 passed through it to seal the discharge outlet of nozzle 11. A vaporizing fuel pipe 18 has one end fitted within the threaded opening 10 of the extension 7 that projects from the base of recess 2, said pipe extending through the longitudinal center of body 1 and terminating adjacent the discharge outlet of nozzle 11. At its central portion body 1 is provided with an internally threaded outwardly projecting tubular extension 19 that is engaged by the threaded end of a steam supply pipe 20.

In use, slide 16 is removed from nozzle 11, and fuel admitted to vaporizing pipe 18 through fuel pipe 5 and coupling 3. Steam entering body 1 through pipe 20 contacts with and highly heats pipe 18, and flows to nozzle 11 where it mingles with the fuel from the outlet end of pipe 18 and causes the fuel and steam to be thoroughly mixed and atomized when discharged from said nozzle, so that a thorough combustion of the fuel is assured.

To clean the burner, slide 16 is placed within opening 14 of nozzle 11 which seals said nozzle, and the fuel pipe having been closed by means of its valve 21, and plug 4 having been removed from coupling 3, it will be seen that the steam from pipe 20 will enter pipe 18 and flow through the same and out through the straight passage of coupling 3 with sufficient force to scour both pipe 18 and coupling 3.

What I claim as my invention is:—

1. An oil burner comprising a body, a fuel pipe therein, a nozzle detachably secured to one end of said body and provided with a transverse groove at the outlet end, a slide adapted to be fitted in said groove to seal said outlet, a flexible connection between said slide and nozzle, a valve controlled feed pipe at the other end of said body, a removable plug carried thereby, and means for supplying steam to said body.

2. An oil burner comprising a body provided with an externally threaded tubular extension at one end and an internally threaded recessed extension at the other end, the inner part of said recessed extension provided with a reduced portion that projects into said body and provided with a threaded opening, a fuel pipe having one end seated in said opening and the other end projecting through the externally threaded extension of said body, a coupling attached to said recessed extension, a removable plug for said coupling, a valve controlled feeding pipe threaded to said coupling, means for supplying steam to said body, and a nozzle attached to said externally threaded tubular extension and adapted to surround the projected end of said fuel pipe.

In testimony whereof I hereunto affix my signature in presence of two witnesses.

HENRY N. KELLAR.

Witnesses:
CHARLES M. RINEHART,
D. L. EBERHARD.